United States Patent
Moncur et al.

(10) Patent No.: US 9,580,564 B2
(45) Date of Patent: Feb. 28, 2017

(54) TRANSPARENT POLYURETHANE PROTECTIVE COATING, FILM AND LAMINATE COMPOSITIONS WITH ENHANCED ELECTROSTATIC DISSIPATION CAPABILITY, AND METHODS FOR MAKING SAME

(75) Inventors: Marlowe Moncur, Irvine, CA (US); Lin Hoo, Torrance, CA (US); Stephen Sandlin, Long Beach, CA (US)

(73) Assignee: GKN Aerospace Transparency Systems, Inc., Garden Grove, CA (US)

( * ) Notice: Subject to any disclaimer, the term of this patent is extended or adjusted under 35 U.S.C. 154(b) by 141 days.

(21) Appl. No.: 12/841,916

(22) Filed: Jul. 22, 2010

(65) Prior Publication Data

US 2012/0021209 A1 Jan. 26, 2012

(51) Int. Cl.
*B32B 27/40* (2006.01)
*B32B 37/02* (2006.01)
(Continued)

(52) U.S. Cl.
CPC ............... *C08J 5/12* (2013.01); *B32B 27/08* (2013.01); *B32B 27/365* (2013.01); *B32B 27/40* (2013.01); *B64C 1/1484* (2013.01); *B32B 2255/10* (2013.01); *B32B 2255/20* (2013.01); *B32B 2255/205* (2013.01); *B32B 2307/202* (2013.01);
(Continued)

(58) Field of Classification Search
USPC .................. 428/306.6, 307.3, 336, 411.1
See application file for complete search history.

(56) References Cited

U.S. PATENT DOCUMENTS 5,840,429 A * 11/1998 Rukavina et al. ............ 428/412
5,853,869 A * 12/1998 Adachi et al. ................ 428/325
(Continued)

FOREIGN PATENT DOCUMENTS

| | | |
|---|---|---|
| CN | 1196317 A | 10/1998 |
| CN | 1787914 A | 6/2006 |
| JP | 10-166497 | 6/1998 |
| JP | 2010-517805 A | 5/2010 |
| WO | WO 2008076473 A2 * | 6/2008 |

OTHER PUBLICATIONS

Gross et al., Electrical, optical and morphological properties of nanoparticle indium-tin-oxide layers, Thin Solid Films, 2007, vol. 515, pp. 8567-8572.*

*Primary Examiner* — Callie Shosho
*Assistant Examiner* — Patrick English
(74) *Attorney, Agent, or Firm* — Sheppard, Mullin, Richter & Hampton LLP

(57) ABSTRACT

The present invention is embodied in a transparent, polyurethane laminate or multi-layer coating comprising a first transparent polyurethane layer, a middle conductive material layer disposed on the first transparent polyurethane layer, and a second transparent polyurethane layer disposed on the conductive layer. In one embodiment, the subject invention addresses the problem of static charge buildup on aircraft transparencies by allowing charge to drain through the second transparent polyurethane layer to the conductive material layer and then to the edge of the conductive material layer, where it is mated to the airframe. The present invention is also embodied in a method for forming a transparent polyurethane laminate on a transparent substrate and a method for forming a free-standing laminate.

28 Claims, 3 Drawing Sheets

(51) Int. Cl.
  *B32B 37/14* (2006.01)
  *B32B 5/18* (2006.01)
  *C08J 5/12* (2006.01)
  *B32B 27/08* (2006.01)
  *B32B 27/36* (2006.01)
  *B64C 1/14* (2006.01)

(52) U.S. Cl.
  CPC ..... *B32B 2307/21* (2013.01); *B32B 2307/412* (2013.01); *B32B 2605/18* (2013.01); *B64C 1/1492* (2013.01); *C08J 2375/04* (2013.01); *Y10T 156/10* (2015.01); *Y10T 428/265* (2015.01); *Y10T 428/31554* (2015.04); *Y10T 428/31598* (2015.04); *Y10T 428/31609* (2015.04)

(56) References Cited

U.S. PATENT DOCUMENTS

| | | | |
|---|---|---|---|
| 5,939,188 A * | 8/1999 | Moncur et al. | 428/332 |
| 5,965,853 A * | 10/1999 | Hornsey | 181/289 |
| 6,071,621 A * | 6/2000 | Falaas et al. | 428/425.8 |
| 6,093,451 A * | 7/2000 | Sandlin et al. | 428/423.1 |
| 6,399,205 B1 | 6/2002 | Sandlin et al. | |
| 6,458,875 B1 | 10/2002 | Sandlin et al. | |
| 6,984,265 B1 * | 1/2006 | Raguse et al. | 117/73 |
| 2005/0215689 A1 * | 9/2005 | Garbar et al. | 524/440 |
| 2006/0054868 A1 | 3/2006 | Dai et al. | |
| 2007/0002433 A1 * | 1/2007 | Chen | F21V 9/04 359/359 |
| 2010/0073764 A1 * | 3/2010 | Kai | G02B 5/204 359/359 |

\* cited by examiner

TRANSPARENT POLYURETHANE PROTECTIVE COATING, FILM AND LAMINATE COMPOSITIONS WITH ENHANCED ELECTROSTATIC DISSIPATION CAPABILITY, AND METHODS FOR MAKING SAME

BACKGROUND OF THE INVENTION

The present invention relates generally to transparent polyurethane compositions, and to coated and laminated aircraft transparencies incorporating such compositions, and more particularly to such compositions, coated transparencies, and laminates having antistatic or static dissipative properties.

Transparencies used for modern military aircraft often require a protective, erosion-resistant coating or film located on the outer surface. Such protective outer layers are required to prevent damage to fragile underlying metal or ceramic conductive coatings, such as gold or indium tin oxide (ITO), or to protect a plastic surface having limited environmental durability, such as polycarbonate. Transparent polyurethane coatings and films are preferred for these applications due to their superior erosion resistance properties, excellent transparency and good environmental durability.

The outer surface of an aircraft transparency is subject to electrostatic charging, especially with high performance aircraft. This charging is caused by contact with ice crystals and other particles during flight, which results in transfer of a charge to the surface via triboelectric or frictional effects. This phenomenon is called precipitation charging, or p-static charging, in the industry.

P-static charging of a non-conductive (dielectric) outer surface can create several serious problems affecting aircraft performance, transparency service life, and safety. Discharge during flight can result in damage to outer coating layers from dielectric breakdown or can result in electronic interference with instruments. Such charge accumulation can also create shock hazards for flight and ground personnel.

To prevent these problems caused by charging, the outer layer of an aircraft transparency must be sufficiently conductive to allow the charge to drain across the surface to the airframe or through the thickness of the layer to an underlying conductive metallic or metal oxide layer. Polyurethanes and other organic polymers generally are poor conductors of electricity. Consequently, these polymers cannot be used satisfactorily without modification in applications where static dissipative properties are required.

Several methods have been used in the past to modify polyurethanes so as to increase their electrical conductivity, and thereby to better dissipate a buildup of static charge. In one such method, conductive fibers or particles are incorporated into the polyurethane matrix. This method is not suitable for use with polyurethanes that are transparent, however, because the conductive filler materials are opaque and greatly reduce the light transmission of the modified material. With a relatively thick layer required for highest erosion resistance, >0.002 inch (>50µ), incorporation of such additives to required levels reduces light transmission drastically.

In another method for modifying polyurethanes to increase their electrical conductivity, conductive polymers such as polyaniline or polythiophene salts are incorporated into the polyurethane matrix. Again, however, this method is not suitable for use with polyurethanes that are transparent, because the conductive polymer additives form a dispersed phase that reduces transparency. In addition, polyanilines, polythiophenes and other conductive polymers do not have good environmental stability and generally cause reduction in overall resistance to weathering and environmental degradation.

In yet another method for modifying polyurethanes to increase their electrical conductivity, hydrophilic additives such as amines and quaternary ammonium salts are used to increase the polyurethane's surface conductivity. These additives function by migrating to the polyurethane's surface, where they attract water and thereby create a conductive film. This method is not suitable for polyurethane coatings and laminates, however, because the additive also migrates to the surface of the polyurethane that interfaces with the underlying substrate, resulting in a loss of adhesion. In addition, such additives can lose their effectiveness over time, because they can leach from the polyurethane under normal use conditions.

In general, non-ionic additives and polyol modifiers have been found to significantly enhance electrical conductivity only if used at high levels, which can adversely affect other important properties, such as transparency and mechanical strength. Ionic additives, including quarternary ammonium salts and ionizable metal salts, generally are more effective in enhancing electrical conductivity. The most effective known additives of this kind are ionizable metal salts of perfluoroalkylsulfonates. However, none of these ionic additives is considered fully satisfactory for use in transparent polyurethanes used as coatings or in laminates, because they are fugitive and with aging they can cause a loss of transparency and a loss of adhesion.

None of these known additives for increasing the electrical conductivity of polyurethanes is considered fully satisfactory for use in polyurethanes that are transparent, and particularly in polyurethanes that are used as coatings or in laminates for aircraft windows.

Recently, systems containing less fugitive additives or modifiers have been developed that show improved performance compared to dispersed salts. Such systems are described in U.S. Pat. No. 6,458,875 to Sandlin et al. Additional performance improvements beyond those disclosed in U.S. Pat. No. 6,458,875 have been demonstrated by use of ionic functional groups incorporated into the polyurethane polyol backbone to create a truly non-fugitive ionic system. These modifications represent the current state of the art.

All prior art modification methods used to enhance conductivity of thick polyurethane coatings and films suffer from one limitation: Conductivity is strongly dependent on temperature. As temperature is reduced, conductivity and ability to dissipate accumulated surface charge drop by orders of magnitude. Since aircraft operating at high altitudes regularly experience transparency surface temperatures of −40° F. or lower, electrostatic discharge capability must be maintained at low temperatures. Current systems are marginal with respect to this requirement.

It can readily be appreciated that there is a need for a protective, thick polyurethane coating that maintains high p-static dissipation capability at all operational temperatures without compromise of other performance properties. The present invention fulfills this need and provides further related advantages.

SUMMARY OF THE INVENTION

The present invention is embodied in a transparent, polyurethane laminate or multi-layer coating comprising a first transparent polyurethane layer, a middle conductive material layer disposed on the first transparent polyurethane layer, and a second transparent polyurethane layer disposed on the conductive layer. In one embodiment, the subject invention addresses the problem of static charge buildup on aircraft transparencies by allowing charge to drain through the second transparent polyurethane layer to the conductive material layer and then to the edge of the conductive material layer, where it is mated to the airframe. The term "laminate" herein includes any product made by uniting superposed layers of one or more materials, including multi-layer coatings and films.

In one embodiment, the first polyurethane layer is an inner layer that adheres to a surface or an object that is to be protected. The second polyurethane layer is an outer layer that interacts with the environment. The conductive material layer lies between the inner and outer polyurethane layers.

In another embodiment, the middle conductive material layer is formed as a mesh or porous network that allows the outer polyurethane layer to interact and bond with the inner polyurethane layer through the porous network. The interaction of the inner and outer polyurethane layers allows the transparent polyurethane laminate to behave substantially like a single, thick polyurethane layer with regard to abrasion and erosion resistance.

In a further embodiment, the transparent polyurethane laminate is at least 0.002 inches thick, and the second transparent polyurethane layer is approximately 0.0002 inches to approximately 0.0006 inches thick.

In a particular embodiment, the conductive layer comprises a nanoparticle dispersion cured with a silicate binder. The nanoparticle dispersion may be a colloidal metal oxide nanoparticle dispersion and, more specifically, a colloidal indium tin oxide nanoparticle dispersion. The first transparent polyurethane layer and second transparent polyurethane layer may comprise an aliphatic polyesterurethane formed from a diisocyanate, a polycaprolactone diol, and a polycaprolactone triol.

The present invention is also embodied in a method for forming a transparent polyurethane laminate or multi-layer coating on a transparent substrate. The method comprises the steps of forming a first transparent polyurethane layer on the transparent substrate, forming a conductive material layer as a porous network on the first transparent polyurethane layer, forming a second transparent polyurethane layer on the conductive material layer, and bonding the first transparent polyurethane layer to the second transparent polyurethane layer through the porous network.

In one embodiment, the step of forming a first transparent polyurethane layer comprises applying an approximately 70-percent-solids-content aliphatic polyesterurethane precursor solution to the transparent substrate, followed by evaporation of the solvent and thermal cure of the precursors. "70-percent-solids-content" means that the solution has 70-percent dissolved components (polyesterurethane precursors in this case) and 30-percent solvent. The step of forming a second transparent polyurethane layer comprises applying an approximately 45-percent-solids-content aliphatic polyesterurethane precursor solution to the conductive layer, followed by evaporation of the solvent and thermal cure of the precursors. "45-percent-solids-content" means that the solution has 45-percent dissolved components (polyesterurethane precursors in this case) and 55-percent solvent. The second transparent polyurethane layer may be formed to be approximately 0.0002 inches to approximately 0.0006 inches thick. The solids content may be adjusted to give the desired layer thickness and will depend upon the properties of the particular polyurethane used.

In another embodiment, the step of forming a conductive layer comprises coating the first transparent polyurethane layer with a nanoparticle dispersion. The nanoparticle dispersion may be cured with a silicate binder. The nanoparticle dispersion may be a colloidal metal oxide nanoparticle dispersion and, more specifically, a colloidal indium tin oxide nanoparticle dispersion. The nanoparticle-plus-silicate coating preferably has a surface resistance of $10^8$ ohm per square or lower.

In a further embodiment, the step of forming a conductive layer comprises applying an approximately five-percent-solids coating solution containing a colloidal indium tin oxide nanoparticle dispersion to the first transparent polyurethane layer to produce a colloidal nanoparticle coating. An approximately 0.1-percent-solids silicate coating solution may be applied over the colloidal nanoparticle coating.

The present invention is further embodied in a method for forming a free-standing laminate. The method comprises the steps of forming a conductive layer as a porous network on a transparent polyurethane sheet, forming a thin layer of transparent polyurethane on the conductive layer, and bonding the thin layer of transparent polyurethane to the transparent polyurethane sheet through the porous network.

Other features and advantages of the invention should become apparent from the following description of the preferred embodiments, taken in conjunction with the accompanying drawings, which illustrate, by way of example, the principles of the invention.

BRIEF DESCRIPTION OF THE DRAWINGS

Embodiments of the present invention will now be described, by way of example only, with reference to the following drawings.

FIG. 1 is not drawn to scale.

DETAILED DESCRIPTION OF THE PREFERRED EMBODIMENTS

Figure 1:
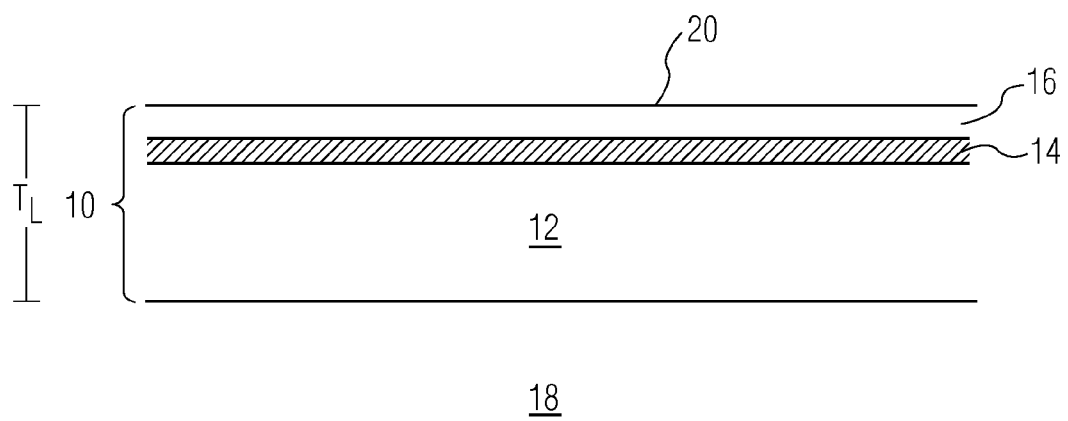
FIG. 1 is a cross-section view of a transparent polyurethane laminate, in accordance with an embodiment of the present invention.

With reference to FIG. 1, there is shown a cross-sectional view of a transparent polyurethane laminate or multi-layer coating 10 in accordance with an embodiment of the present invention. The transparent polyurethane laminate or multi-layer coating comprises an inner polyurethane layer 12, a middle conductive material layer 14, and an outer polyurethane layer 16. The laminate can be disposed on an aircraft transparency 18.

In one embodiment, the laminate or multi-layer coating 10 is used as an outer protective, erosion-resistant shield for aircraft transparencies. The laminate or multi-layer coating efficiently drains static charge from its outer surface 20 at all operational temperatures typically encountered in flight. The overall thickness $T_L$ of the polyurethane laminate is at least 0.002 inch (50 µ), and preferably at least 0.003 inch (75µ).

The p-static drain capability is provided by the conductive layer 14, which is located 0.0002 inch to 0.0006 inch (5 μ to 15 μ) below the outer surface of the laminate.

Suitable polyurethanes for the inner layer 12 and outer layer 16 are aliphatic polyether or polyester types. In one embodiment, the polyurethane is a thermoset polyurethane made from aliphatic di- or polyisocyanates and polycaprolactone diols and triols.

Conductive modification of the polyurethane is not required as the surface charge can trickle through to the embedded conductive layer 14 at a sufficient rate to prevent damaging discharge events. Also, electrostatic discharge performance of such systems has been found to be substantially independent of temperature.

In one embodiment, the embedded conductive layer 14 is a very thin coating made from a colloidal indium tin oxide (ITO) nanoparticle dispersion cured with a silicate binder. Surface conductivity is less than $10^8$ ohm per square, which is sufficient to drain the charge across the canopy surface. Such coatings have been found to be extremely compatible with the polyurethanes disclosed above, allowing the inner layer 12 and outer layer 16 to bond through the conductive ITO layer 14, which is believed to form a porous network in the cured state. This allows the layered polyurethane laminate to have properties similar to single layer polyurethane with respect to abrasion and erosion resistance.

The thicker inner polyurethane layer 12 may be applied as a coating, or it may be a cast or extruded polyurethane film. The film may be free standing or may be laminated or cast onto a glass or plastic substrate, such as the transparency 18. The substrate may carry a low-resistance conductive coating layer (not shown) depending on the application.

In one embodiment, the electrostatic discharge layer 14 is applied as a two-part coating. Initially, a colloidal metal oxide nanoparticle dispersion (ITO preferred) is applied from a dilute solution. After drying, a silicate coating is applied over the metal oxide, also from a dilute solution. The system becomes conductive upon cure of the silicate. It is believed that the ITO forms an open conductive network during this step.

The thinner outer polyurethane layer 16 may be applied by a coating process. In one embodiment, the outer layer is the same or very similar to the inner polyurethane layer 12 in chemical composition. It is believed that the top polyurethane layer penetrates through the metal oxide network of the middle conductive layer 14 and co-cures with the lower polyurethane layer, resulting in single layer mechanical performance. The p-static discharge layer 14 maintains conductivity during this co-cure process.

Conductive Coating

Below are described particular compositions and methods for creating a conductive coating for the conductive middle layer 14 in accordance with an embodiment of the present invention. In this embodiment, the conductive coating comprises a 5-percent solids coating solution containing a colloidal ITO nanoparticle dispersion and a 0.1-percent solids silicate coating solution.

A 5-percent solids coating solution containing a colloidal ITO nanoparticle dispersion may be prepared by mixing the components set forth in Table 1.

TABLE 1

5-Percent Solids Coating Solution

| | |
|---|---|
| 30% ITO dispersion (Advanced Nano Products TRB SH812) | 16.7 g |
| Anhydrous ethanol | 75.0 g |
| 1-Butanol | 8.3 g |

A silicate binder stock solution may be prepared by mixing the components set forth in Table 2.

TABLE 2

Silicate Binder Stock Solution

| | |
|---|---|
| Anhydrous ethanol (initial) | 45.7 g |
| De-ionized water | 4.0 g |
| Concentrated nitric acid | 0.8 g |
| Tetraethyl orthosilicate | 5.6 g |
| Anhydrous ethanol (final) | 43.9 g |

Initially, 45.7 grams of anhydrous ethanol, 4.0 grams of de-ionized water, and 0.8 grams of concentrated nitric acid are mixed for two minutes. After mixing for two minutes, 5.6 grams of tetraethyl orthosilicate are added. The solution is stirred overnight at room temperature. Then, the final 43.9 grams of anhydrous ethanol are added, followed by ten more minutes of stirring.

A 0.1-percent solids silicate coating solution may be prepared by mixing the components set forth in Table 3.

TABLE 3

0.1-percent solids silicate coating solution

| | |
|---|---|
| Silicate binder stock solution prepared as described above | 5.0 g |
| 1-Butanol | 95.0 g |

To prepare a conductive coating on a polycarbonate substrate, the 5-percent ITO coating solution described in Table 1 may be flow coated onto a flat polycarbonate sheet oriented in a near vertical position. The coated sheet is then air dried for thirty minutes. The 0.1-percent silicate coating solution described in Table 3 is then flow coated over the ITO coating and air dried for thirty minutes.

POLYURETHANE COATING EXAMPLES

Below are described eleven examples of polyurethane coatings that may be used in combination with the conductive coating described above.

Examples 1-3

In examples 1-3, three polyurethane protective coatings were prepared as described in U.S. Pat. No. 6,458,875 to Sandlin et al., Example 15. A transparent aliphatic polyesterurethane mix, suitable for coating, laminating or casting, was prepared from the formulation set forth in Table 4 below.

TABLE 4

Aliphatic Polyesterurethane Formulation for Examples 1-3

| Raw Material | Description | Parts (wt. %) |
|---|---|---|
| Desmodur W[1] | Bis(4-isocyanato-cyclohexyl)methane | 38.21 |

TABLE 4-continued

Aliphatic Polyesterurethane Formulation for Examples 1-3

| Raw Material | Description | Parts (wt. %) |
|---|---|---|
| CAPA 3050[2] | Polycaprolactone triol | 43.42 |
| CAPA 2085[2] | Polycaprolactone diol | 17.01 |
| Butanediol | Chain extender | 0.36 |
| Tinuvin 328[3] | UV stabilizer | 0.50 |
| Irganox 1010[3] | Antioxidant | 0.50 |

[1]Available from Bayer
[2]Available from Perstop Specialty Chemicals
[3]Available from Ciba-Geigy After a homogeneous solution of the specified polyesterurethane mix was prepared, with the solution temperature at 100° F., 30 ppm dibutyl tin dilaurate catalyst and an antistatic additive were added. The antistatic additive was Fluorad HQ115, a lithium trifluoro-methanesulfonimide available from 3M, having a weight percentage of 1.0 percent.

The three example coatings were prepared and were diluted to the solids content shown in Table 5 using di-isobutyl ketone.

TABLE 5

Solids Content of Examples 1-3

| Example 1 | 75% |
| Example 2 | 50% |
| Example 3 | 25% |

Each of the poly urethane coatings of Examples 1-3 was applied to a separate polycarbonate panel over a conductive coating prepared per Tables 1-3. The coated panels were cured by exposing them to a temperature of 120° F. for 12 hours followed by 180° F. for 24 hours. A "control" example prepared per Tables 1-3 with no polyurethane overcoat was also cured under the same conditions.

The panel having no polyurethane topcoat had a sheet resistance of $10^5$ ohms per square after cure. The polyurethane coating thicknesses on the three topcoated panels were measured as follows:

TABLE 6

Polyurethane Coating Thicknesses of Examples 1-3

| Example 1 | 0.0015 in. (38μ) |
| Example 2 | 0.0005 in. (13μ) |
| Example 3 | 0.00014 in. (3.5μ) |

Figure 2:
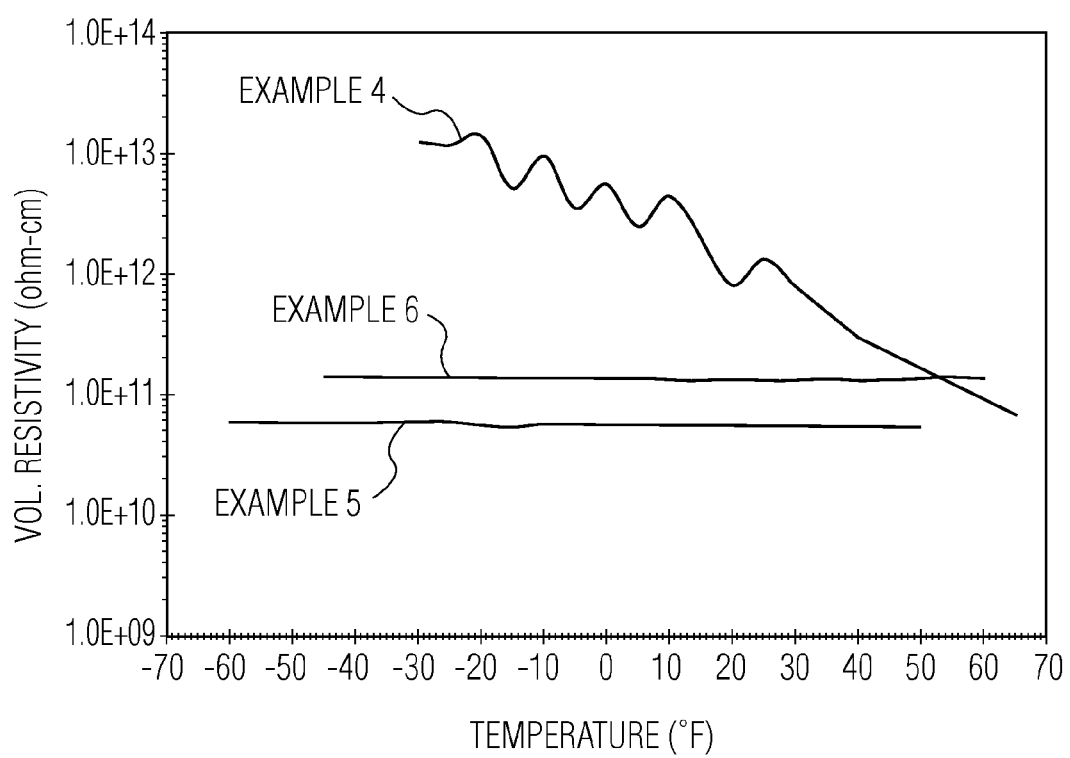
FIG. 2 is a graph showing the relationship between temperature and the volume resistivity of polyurethane for three different thicknesses of polyurethane, in accordance with an embodiment of the present invention.

The ability to drain surface charge was determined on the three polyurethane-coated panels as a function of temperature by the methods described in U.S. Pat. No. 6,458,875 using the equipment and general procedure described in ASTM D-257. The volume resistivities calculated from the voltage and current measured at each temperature are shown in FIG. 2.

Example 1 shows a temperature dependence similar to prior art systems, with a change in resistivity of three orders of magnitude between +70° F. and −40° F. This large change in resistivity is believed to be caused by reduced molecular mobility as temperature is lowered. Examples 2 and 3 show no such temperature dependence. FIG. 2 indicates that, with thinner coatings, surface charge can dissipate by a different mechanism that does not require molecular mobility.

Example 4

In example 4, a polyurethane coating was prepared from the components set forth in Table 7 below.

TABLE 7

Aliphatic Polyesterurethane Formulation for Example 4

| Raw Material | Description | Parts (wt. %) |
|---|---|---|
| Desmodur W[1] | Bis(4-isocyanato-cyclohexyl)methane | 39.5 |
| CAPA 3050[2] | Polycaprolactone triol | 33.8 |
| CAPA 2085[2] | Polycaprolactone diol | 25.7 |
| Tinuvin 328[3] | UV stabilizer | 0.5 |
| Irganox 1010[3] | Antioxidant | 0.5 |

[1]Available from Bayer
[2]Available from Perstop Specialty Chemicals
[3]Available from Ciba-Geigy The coating solution of Example 4 was prepared by adding dipropylene glycol dimethyl ether to the formulation of Table 7 to give a 90-percent solids solution. The coating was applied over a conductive coated polycarbonate panel prepared per Tables 1-3. The polyurethane coating was cured at 120° F. for 12 hours followed by 250° F. for 18 hours. Polyurethane coating thickness was 0.003 inches (75 μ).

Example 5

Example 5 comprised two coating solutions, an inner coating solution and an outer coating solution, each having the same polyurethane composition as in Example 4. The solvents and final solids contents were as shown in Table 8.

TABLE 8

Solvents and Final Solids Contents for Example 5

| Inner coating | Dipropylene glycol dimethyl ether, 70% |
| Outer coating | 2-Butoxyethyl acetate, 45% |

The inner coating was flow coated directly onto a polycarbonate sheet having no conductive coating. The coating was cured for 12 hours at 120° F. followed by 18 hours at 250° F. The coating thickness was 0.0025 inch (63 μ).

A conductive ITO/silicate coating prepared according to Tables 1-3 was applied over the inner polyurethane coating. The conductive coating was cured at 250° F. for 1 hour.

The outer coating of Table 8 was then applied over the ITO/silicate coating and cured at 250° F. for 18 hours. The thickness of the outer coating was 0.0005 inch (13 μ).

The ability to drain surface charge was then characterized for the Example 4 and Example 5 coating systems, applied as described above. Note that the polyurethanes used in Examples 4 and 5 contained no conductive or ionic additives to enhance their ability to drain charge. Results are shown in Table 9.

TABLE 9

Comparative Charge Dissipation Performance of Example 4 and Example 5 Coatings

| | Example 5 System | | | | Example 4 System | | | |
| --- | --- | --- | --- | --- | --- | --- | --- | --- |
| Temp. (° F.) | Voltage (−kV) | Current (−µA) | Charge Density (−µA/sq. ft.) | Vol. Resistivity (ohm-cm) | Voltage (−kV) | Current (−µA) | Charge. Density (−µA/sq ft) | Vol. Resistivity (ohm-cm) |
| 55 | 4.5 | 3.0 | 108.0 | $2 \times 10^{12}$ | 10 | 0 | 0 | $>10^{14}$ |
| 45 | 4.5 | 3.0 | 108.0 | $2 \times 10^{12}$ | | | | |
| 35 | 4.5 | 3.0 | 108.0 | $2 \times 10^{12}$ | | | | |
| 25 | 4.5 | 3.0 | 108.0 | $2 \times 10^{12}$ | | | | |
| 15 | 4.5 | 3.0 | 108.0 | $2 \times 10^{12}$ | | | | |
| 5 | 4.5 | 3.0 | 108.0 | $2 \times 10^{12}$ | | | | |
| −5 | 4.5 | 3.0 | 108.0 | $2 \times 10^{12}$ | | | | |
| −15 | 4.5 | 3.0 | 108.0 | $2 \times 10^{12}$ | | | | |
| −25 | 4.5 | 3.0 | 108.0 | $2 \times 10^{12}$ | | | | |
| −35 | 4.5 | 3.0 | 108.0 | $2 \times 10^{12}$ | | | | |
| −45 | 4.5 | 3.0 | 108.0 | $2 \times 10^{12}$ | | | | |
| −55 | 4.5 | 3.0 | 108.0 | $2 \times 10^{12}$ | | | | |

At a temperature of 55° F. and a voltage of 10,000 volts, the Example 4 system produced no measurable current, yielding a volume resistivity of greater than $10^{14}$ ohm-cm. Measurements were taken for Example 5 at increments of ten degrees Fahrenheit from 55° F. to −55° F. At a voltage of 4,500 volts, the Example 5 system produced 3.0 µA current, a 108.0 µA/sq. ft. charge density, and $2 \times 10^{12}$ ohm-cm volume resistivity for all temperatures in the range. For Example 5, flatwise adhesion of the coating system was measured at 1350 psi, which indicates that excellent bonding was achieved between the two polyurethane coating layers, through the conductive ITO layer.

These results show that Example 4, an unmodified polyurethane coating having the thickness needed for high erosion resistance, is a good dielectric with no measurable static drain through the coating to the underlying conductive layer. Example 5, having two unmodified polyurethane coatings and the same overall thickness as Example 4, shows excellent charge dissipation capability with no temperature dependence. The charge current density of 108 µA/sq. ft. is approximately three times the level observed for aircraft transparencies under worst case conditions. The outer polyurethane layer is thick enough to adequately protect the embedded conductive layer and forms a strong bond with the base polyurethane layer to give erosion and abrasion resistance performance comparable to a single-layer thick coating.

Example 6

A polyurethane sheet 0.040-inch thick was cast using the formulation of Example 4 except with no solvent. The sheet was cast between glass plates treated with release agent, with a spacer seal around the perimeter. The sheet was cured at 200° F. for 16 hours.

An ITO/silicate coating prepared per Tables 1-3 was applied to one surface of the polyurethane sheet and cured at 200° F. for 1 hour. The outer coating of Example 5 (Table 8) was then applied over the ITO/silicate layer and cured at 200° F. for 16 hours. The electrostatic drain properties of the coated sheet were then evaluated and found to be comparable to the Example 5 system at ambient temperature and at −40° F. The calculated volume resistivity was $1.4 \times 10^{12}$ ohm-cm.

Example 7

A stretched acrylic sample was coated with a polysiloxane basecoat, a sputtered metallic stack, and a two-layer polyurethane protective coating system as described in U.S. Pat. No. 6,458,875 to Sandlin et al., Examples 1 and 30, except that the top polyurethane layer was made from the components listed in Table 10 below. The sulfonated polyurethane in Table 10 was alloyed with the polyols by mixing at 190° F.-210° F. for 48 hours before formulating with the isocyanate and other components. The top layer was flow coated from a 90-percent solids solution in 2-butoxyethyl acetate solvent. The thickness of the cured topcoat was approximately 0.004-0.005 inch (approximately 100-125µ).

TABLE 10

Example 7 Components

| Raw Material | Description | Parts (wt.) |
| --- | --- | --- |
| Desmodur W[1] | Bis(4-isocyanatocyclohexyl)methane | 35.33 |
| CAPA 3050[2] | Polycaprolactone triol | 37.84 |
| CAPA 2085[2] | Polycaprolactone diol | 15.09 |
| 1,4-Butanediol[3] | Chain extender | 0.32 |
| Sulfonated polyurethane[1] | Aliphatic polyester urethane resin, Mn 29,000, 6% sulfonate | 8.79 |
| Fluorad HQ115[5] | Lithium trifluoromethanesulfonimide | 0.88 |
| Cyagard 1164[6] | UV stabilizer | 0.44 |
| Sanduvor 3055[7] | UV stabilizer | 0.44 |
| Irganox 1010[4] | Antioxidant | 0.44 |
| Tinuvin 328[4] | UV stabilizer | 0.44 |

[1]Available from Bayer
[2]Available from Perstop Specialty Chemicals
[3]Available from BASF
[4]Available from Ciba-Geigy
[5]Available from 3M
[6]Available from Cytec
[7]Available from Clariant Example 8

The outer surface of the Example 7 system was cleaned and abraded using a cerium oxide slurry in a 50/50 water/isopropanol mixture and wool felt. After drying, the 5% ITO coating solution from Table 1 was flow coated onto the surface and air dried for thirty minutes. The 0.1% silicate coating solution from Table 3 was flow coated over the ITO coating and then air dried for thirty minutes. The sample was then heated in an air oven at 180° F. for 1 hour. The surface conductivity was measured at 2×10⁷ ohms/square.

A polyurethane layer was then applied over the surface using the same composition as the Example 7 topcoat but at 45% solids content in a 2-butoxyethyl acetate solvent. The top layer was cured at 130° F. for 12 hours followed by 180° F. for 16 hours.

Figure 3:
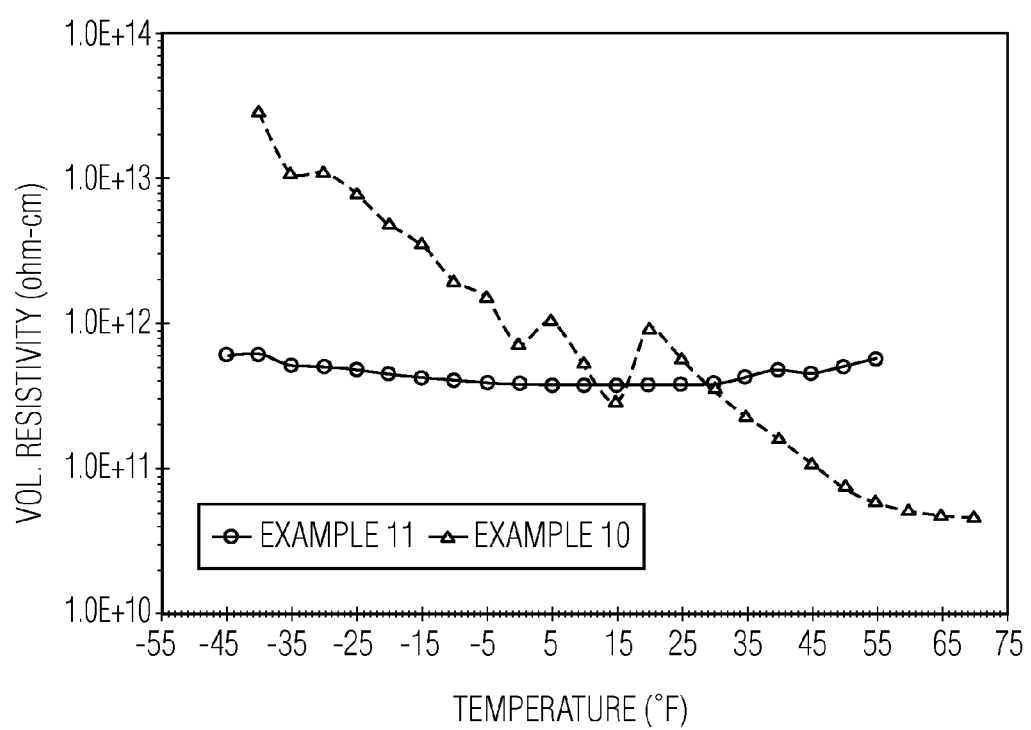
FIG. 3 is a graph showing the relationship between temperature and the volume resistivity of polyurethane for the Example 7 and Example 8 coatings, in accordance with an embodiment of the present invention.

The ability of the Example 7 and 8 samples to dissipate p-static charge was then characterized by the methods described in U.S. Pat. No. 6,458,875 the Sandlin et al. using equipment and the general procedure described in ASTM D-257. The results are shown in Table 11 and FIG. 3.

TABLE 11

Comparative Charge Dissipation Performance of Example 7 and Example 8 Coatings

| | Example 8 System | | | | Example 7 System | | | |
|---|---|---|---|---|---|---|---|---|
| Temp (° F.) | Voltage (−kV) | Current (−μA) | Charge Density (−μA/sq. ft.) | Resistivity (ohm-cm) | Voltage (−kV) | Current (−μA) | Charge Density (−μA/sq. ft.) | Resistivity (ohm-cm) |
| 55 | 0.1 | 3.6 | 129.6 | 5.6E+11 | 1.0 | 35.2 | 1267.2 | 5.8E+10 |
| 50 | 0.1 | 4.1 | 147.6 | 5.0E+11 | 1.0 | 27.4 | 986.4 | 7.4E+10 |
| 45 | 0.1 | 4.5 | 162 | 4.5E+11 | 1.0 | 19 | 684 | 1.1E+11 |
| 40 | 0.1 | 4.3 | 154.8 | 4.7E+11 | 1.0 | 13.1 | 471.6 | 1.5E+11 |
| 35 | 0.1 | 4.8 | 172.8 | 4.2E+11 | 1.0 | 8.9 | 320.4 | 2.3E+11 |
| 30 | 0.1 | 5.3 | 190.8 | 3.8E+11 | 1.0 | 5.7 | 205.2 | 3.6E+11 |
| 25 | 0.1 | 5.4 | 194.4 | 3.8E+11 | 1.0 | 3.6 | 129.6 | 5.6E+11 |
| 20 | 0.1 | 5.43 | 195.48 | 3.7E+11 | 1.0 | 2.2 | 79.2 | 9.2E+11 |
| 15 | 0.1 | 5.45 | 196.2 | 3.7E+11 | 2.0 | 14.1 | 507.6 | 2.9E+11 |
| 10 | 0.1 | 5.43 | 195.48 | 3.7E+11 | 2.0 | 7.7 | 277.2 | 5.3E+11 |
| 5 | 0.1 | 5.4 | 194.4 | 3.8E+11 | 2.0 | 3.9 | 140.4 | 1.0E+12 |
| 0 | 0.1 | 5.3 | 190.8 | 3.8E+11 | 3.0 | 8.5 | 306 | 7.2E+11 |
| −5 | 0.1 | 5.22 | 187.92 | 3.9E+11 | 3.0 | 4 | 144 | 1.5E+12 |
| −10 | 0.1 | 5 | 180 | 4.1E+11 | 4.0 | 4.2 | 151.2 | 1.9E+12 |
| −15 | 0.1 | 4.76 | 171.36 | 4.3E+11 | 4.0 | 2.3 | 82.8 | 3.5E+12 |
| −20 | 0.1 | 4.5 | 162 | 4.5E+11 | 5.0 | 2.1 | 75.6 | 4.8E+12 |
| −25 | 0.1 | 4.22 | 151.92 | 4.8E+11 | 5.0 | 1.3 | 46.8 | 7.8E+12 |
| −30 | 0.1 | 4 | 144 | 5.1E+11 | 6.0 | 1.1 | 39.6 | 1.1E+13 |
| −35 | 0.1 | 3.92 | 141.12 | 5.2E+11 | 7.0 | 1.3 | 46.8 | 1.1E+13 |
| −40 | 0.1 | 3.3 | 118.8 | 6.2E+11 | 7.0 | 0.5 | 18 | 2.8E+13 |
| −45 | 0.1 | 3.3 | 118.8 | 6.2E+11 | | | | |
| −50 | 0.1 | 3.3 | 118.8 | 6.2E+11 | | | | |
| −55 | 0.1 | 3.2 | 115.2 | 6.3E+11 | | | | |

Example 9

A 14-inch by 14-inch glass plate was treated with a perfluoroalkylsilane release coating (Surfex™ 100, GKN Aerospace). The glass plate was placed in an oven at 200° F. for 2 hours to cure the release coating. The excess release coating was then removed by buffing the treated surface with cheesecloth. The outer coating of Example 5 (Table 8) was then applied to the treated glass surface by a flow coating process in a near-vertical orientation. After air drying, the polyurethane was then cured at 250° F. for 18 hours.

A conductive ITO/silicate coating prepared per Tables 1-3 was applied over the polyurethane coating. The coating was cured at 250° F. for 1 hour.

The 14-inch by 14-inch glass plate with cured coatings was then assembled into a casting cell by mating with a 0.250-inch-thick polycarbonate sheet of the same size. A 1.0-inch-wide, 0.050-inch-thick silicone rubber sheet spacer/seal was placed around the perimeter between the glass and polycarbonate plates to create a gap approximately 0.050 inch thick. The plates were held together using spring clamps.

A polyurethane mix was prepared as described in Example 4 except no solvent was added. After mixing all ingredients at 100° F. under vacuum, the liquid mixture was poured into the gap in the upper corner of the casting cell while oriented at a 20-degree incline from horizontal. Air was allowed to escape through a second gap on the opposite upper corner. After 130 grams of liquid polyurethane precursor had been poured into the cell, it was lowered to near horizontal to allow the remaining air to escape. Both gaps were then sealed with spacer material and clamps to create a closed cell. The cast polyurethane was then cured at 120° F. for 12 hours, followed by 250° F. for 18 hours.

After cooling, the cell was separated. The glass plate was released from the polyurethane surface to yield a polycarbonate sheet having a bonded thermoset bi-layer polyurethane liner, with the conductive layer embedded at about 0.005 inch (13 μ) below the outer surface. The static drain performance was determined to be comparable to the Example 5 system.

Example 10

Example 9 was repeated except a second release-treated glass plate was used in place of the polycarbonate sheet. After cure of the cast polyurethane, both glass plates were released from the polyurethane to yield a free-standing 0.050-inch bi-layer thermoset polyurethane sheet, with the conductive layer embedded at about 0.005 inch (13 μ) below one surface.

Example 11

A treated glass plate was coated with thermoset polyurethane and conductive ITO/silicate layers as described in Example 9. A sheet of transparent thermoplastic polyurethane, 0.050-inch thick (PE-192, Huntsman), was placed on the polyurethane surface. A second release-treated glass plate was placed over the thermoplastic polyurethane sheet.

This stack of sheets was assembled into a vacuum bag using conventional methods, evacuated for 4 hours under vacuum, and then laminated in an autoclave at 100-psi pressure.

The autoclave temperature was ramped from ambient to 250° F. over 4 hours, held at 250° F. for 2 hours, and then ramped down to 120° F. over 2 hours, all at 100-psi pressure. After release of the pressure and removal from the autoclave, the glass plates separated from both polyurethane surfaces, yielding a bi-layer thermoplastic/thermoset polyurethane sheet having a conductive layer embedded 0.005-inch (13 μ) below the outer thermoset surface. This bi-layer sheet can be laminated to acrylic, glass, polycarbonate, or other material by conventional methods.

Although the invention has been disclosed with reference only to the presently preferred embodiments, those of ordinary skill in the art will appreciate that various modifications can be made without departing from the invention. Accordingly, the invention is defined only by the following claims.

What is claimed is:

1. A laminate comprising:
    a substrate;
    a first transparent polyurethane layer disposed on the substrate and formed as a coating or film;
    a flow-coated conductive layer disposed on the first transparent polyurethane layer; and
    a second transparent polyurethane layer disposed on the flow-coated conductive layer and formed as a coating or film;
    wherein the flow-coated conductive layer is formed as a porous network and comprises a conductive metal oxide; and
    wherein the first transparent polyurethane layer bonds with the second transparent polyurethane layer through the porous network.

2. The laminate of claim 1, wherein the flow-coated conductive layer comprises a conductive metal oxide nanoparticle dispersion.

3. The laminate of claim 2, wherein the conductive metal oxide nanoparticle dispersion is cured with a silicate binder.

4. The laminate of claim 2, wherein the conductive metal oxide nanoparticle dispersion is a colloidal metal oxide nanoparticle dispersion.

5. The laminate of claim 4, wherein the colloidal metal oxide nanoparticle dispersion is a colloidal indium tin oxide nanoparticle dispersion.

6. The laminate of claim 1, wherein the second transparent polyurethane layer comprises an aliphatic polyesterurethane.

7. The laminate of claim 6, wherein the aliphatic polyesterurethane is formed from a diisocyanate, a polycaprolactone diol, and a polycaprolactone triol.

8. The laminate of claim 6, wherein the first transparent polyurethane layer comprises an aliphatic polyesterurethane.

9. The laminate of claim 8, wherein the aliphatic polyesterurethane is formed from a diisocyanate, a polycaprolactone diol, and a polycaprolactone triol.

10. The laminate of claim 1, wherein the second transparent polyurethane layer is approximately 0.0002 inches to approximately 0.0006 inches thick.

11. The laminate of claim 1, wherein:
    the substrate is an aircraft transparency set in an airframe; and
    the flow-coated conductive layer is mated at an edge to the airframe to allow charge to drain through the flow-coated conductive layer to the airframe.

12. The laminate of claim 1, wherein the substrate carries thereon a substrate conductive layer such that the first transparent polyurethane layer is disposed between two conductive layers.

13. The laminate of claim 1, wherein the first transparent polyurethane layer and the second transparent polyurethane layer are free of conductive additives.

14. The laminate of claim 1, wherein the laminate has a charge current density range of 115.2 micro-amps per square foot to 190.8 micro-amps per square foot within a temperature range of −55 degrees Fahrenheit to 0 degrees Fahrenheit, with an applied voltage of 100 volts, characterized according to ASTM D-257.

15. A laminate comprising:
    a first transparent polyurethane layer formed as a coating or film;
    a flow-coated conductive layer disposed on the first transparent polyurethane layer; and
    a second transparent polyurethane layer disposed on the flow-coated conductive layer and formed as a coating or film;
    wherein the flow-coated conductive layer is formed as a porous network and comprises a conductive metal oxide;
    wherein the first transparent polyurethane layer bonds with the second transparent polyurethane layer through the porous network; and
    wherein the first transparent polyurethane layer and the second transparent polyurethane layer are free of conductive additives.

16. The laminate of claim 15, wherein the flow-coated conductive layer comprises a conductive metal oxide nanoparticle dispersion.

17. The laminate of claim 16, wherein the conductive metal oxide nanoparticle dispersion is cured with a silicate binder.

18. The laminate of claim 16, wherein the conductive metal oxide nanoparticle dispersion is a colloidal metal oxide nanoparticle dispersion.

19. The laminate of claim 18, wherein the colloidal metal oxide nanoparticle dispersion is a colloidal indium tin oxide nanoparticle dispersion.

20. The laminate of claim 15, wherein the second transparent polyurethane layer comprises an aliphatic polyesterurethane.

21. The laminate of claim 20, wherein the aliphatic polyesterurethane is formed from a diisocyanate, a polycaprolactone diol, and a polycaprolactone triol.

22. The laminate of claim 20, wherein the first transparent polyurethane layer comprises an aliphatic polyesterurethane.

23. The laminate of claim 22, wherein the aliphatic polyesterurethane is formed from a diisocyanate, a polycaprolactone diol, and a polycaprolactone triol.

24. The laminate of claim 15, wherein the second transparent polyurethane layer is approximately 0.0002 inches to approximately 0.0006 inches thick.

25. The laminate of claim 15, further comprising a substrate on which the first transparent polyurethane layer is disposed.

26. The laminate of claim 25, wherein:
    the substrate is an aircraft transparency set in an airframe; and
    the flow-coated conductive layer is mated at an edge to the airframe to allow charge to drain through the flow-coated conductive layer to the airframe.

27. The laminate of claim 25, wherein the substrate carries thereon a substrate conductive layer such that the first transparent polyurethane layer is disposed between two conductive layers.

28. The laminate of claim 15, wherein the laminate has a charge current density range of 115.2 micro-amps per square foot to 190.8 micro-amps per square foot within a temperature range of −55 degrees Fahrenheit to 0 degrees Fahrenheit, with an applied voltage of 100 volts, characterized according to ASTM D-257.

\* \* \* \* \*